US011783079B2

(12) United States Patent
Bastide et al.

(10) Patent No.: US 11,783,079 B2
(45) Date of Patent: Oct. 10, 2023

(54) PRIVACY PROTECTION FOR REGULATED COMPUTING ENVIRONMENTS

(71) Applicant: INTERNATIONAL BUSINESS MACHINES CORPORATION, Armonk, NY (US)

(72) Inventors: Paul R. Bastide, Ashland, MA (US); Shakil Manzoor Khan, Highland Mills, NY (US); Senthil Bakthavachalam, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 306 days.

(21) Appl. No.: 16/728,047

(22) Filed: Dec. 27, 2019

(65) Prior Publication Data

US 2021/0200894 A1 Jul. 1, 2021

(51) Int. Cl.
*G06F 21/62* (2013.01)
*G06F 16/25* (2019.01)
*G06F 16/21* (2019.01)

(52) U.S. Cl.
CPC ........ *G06F 21/6245* (2013.01); *G06F 16/212* (2019.01); *G06F 16/254* (2019.01)

(58) Field of Classification Search
CPC ... G06F 21/6245; G06F 16/212; G06F 16/254
USPC ........................................................ 726/28
See application file for complete search history.

(56) References Cited

U.S. PATENT DOCUMENTS 10,095,883 B2 10/2018 Antonatos et al.
10,747,898 B2 * 8/2020 Cai ...................... G06F 21/316
(Continued)

FOREIGN PATENT DOCUMENTS

CN 107766745 A 3/2018
CN 108256345 A 7/2018
(Continued)

OTHER PUBLICATIONS

Mell et al., "The NIST Definition of Cloud Computing", Recommendations of the National Institute of Standards and Technology, NIST Special Publication 800-145, Sep. 2011, 7 pages.
(Continued)

*Primary Examiner* — Jeffrey C Pwu
*Assistant Examiner* — Nega Woldemariam
(74) *Attorney, Agent, or Firm* — Daniel G. DeLuca

(57) ABSTRACT

Managing data in a distributed computing environment, such as a cloud computing platform for healthcare. The platform selects a set of hierarchical resources deployed in the distributed computing environment, wherein the set of hierarchical resources comprises a resource member. The platform converts the set of selected hierarchical resources to a localized schema. The platform determines a score for the resource member based on the proximity of the resource member to the healthcare privacy dictionary, wherein the proximity is determined using the localized schema. The platform updates the set of hierarchical resources based on the determined score. The platform controls access to a resource member based on the score determined based on a proximity of a localized schema representation of the resource member to a healthcare privacy dictionary.

16 Claims, 5 Drawing Sheets

(56) References Cited

U.S. PATENT DOCUMENTS

2007/0011134 A1* 1/2007 Langseth .............. G06F 16/254
2022/0006873 A1* 1/2022 Rogynskyy ....... G06F 16/24575

FOREIGN PATENT DOCUMENTS

| CN | 110020546 A | 7/2019 |
|---|---|---|
| EP | 1193587 B1 | 7/2012 |
| JP | 2005190389 A | 7/2005 |

OTHER PUBLICATIONS

Apache Software, "The Standard Query Parser", Apache Solr Reference Guide 6.6, printed Sep. 13, 2019, pp. 1-16, https://lucene.apache.org/solr/guide/6_6/the-standard-query-parser.html.

Douglass et al., "Computer-Assisted De-Identification of Free Text in the MIMIC II Database", Computers in Cardiology 2004, No. 31, pp. 341-344.

Goessner, "Jayway JsonPath", GitHub, Jul. 5, 2017—Released JsonPath 2.4.0, pp. 1-13.

Long, "De-identification algorithm for free-text nursing notes", Computers in Cardiology, Feb. 2005, No. 32, pp. 331-334.

Neamatullah et al., "Automated de-identification of free-text medical records", BMC Medical Informatics and Decision Making 8.1, Jul. 24, 2008, vol. 8, No. 32, pp. 1-17.

Szarvas et al., "State of-the-art Anonymization of Medical Records Using an Iterative Machine Learning Framework", Journal of the American Medical Informatics Association, vol. 14, No. 5, Sep./Oct. 2007, pp. 574-580.

GITHUB, "wiztools / xsd-gen", printed Sep. 13, 2019, 1 page.

* cited by examiner

PRIVACY PROTECTION FOR REGULATED COMPUTING ENVIRONMENTS

BACKGROUND

The present invention relates generally to data management in a distributed computing environment, and more particularly to privacy protection mechanisms for regulated computing environments.

Healthcare systems generally refer to computing systems or environments adapted for use in the healthcare industry, for healthcare-related purposes or to perform healthcare-related tasks. For example, a healthcare system may be configured to store and process electronic health records (EHR) of patients, and to execute workflows that use EHRs. In one implementation, the healthcare system may be a distributed computing system, which also may be referred to as a platform or a cloud platform. These terms will be used interchangeably as needed based on the specific context of embodiments of Applicant's claimed invention.

SUMMARY

Embodiments of the present invention provide methods, systems, and computer program products for managing data in a distributed computing environment.

In an embodiment, a method controls access to a resource member based on a score determined based on a proximity of a localized schema representation of the resource member to a healthcare privacy dictionary.

In a related embodiment, the resource member comprises a data model having a schema format, or a schema-less data model in a common data format.

In a related embodiment, the data model comprises an extension.

In a related embodiment, the extension is added to the data model by an upstream application.

In a related embodiment, the data model is in a hierarchical or relational format; in one embodiment, it is in JSON format.

In a related embodiment, the resource member is a component of a set of hierarchical resources in the distributed computing environment.

In a related embodiment, the method selects a set of hierarchical resources deployed in the distributed computing environment, wherein the set of hierarchical resources comprises the resource member.

In a related embodiment, the method converts the set of selected hierarchical resources to a localized schema.

In a related embodiment, the method determines the score for the resource member based on the proximity of the resource member to the healthcare privacy dictionary, wherein the proximity is determined using the localized schema.

In a related embodiment, the method updates the set of hierarchical resources based on the determined score.

In an embodiment, a computer program product for managing data in a distributed computing environment is provided, and includes one or more computer readable storage media, and program instructions collectively stored on the one or more computer readable storage media. The program instructions comprise instructions for controlling access to a resource member based on a score determined based on a proximity of a localized schema representation of the resource member to a healthcare privacy dictionary.

In a related embodiment, the computer program product also includes instructions for selecting a set of hierarchical resources deployed in the distributed computing environment, wherein the set of hierarchical resources comprises the resource member.

In a related embodiment, the computer program product also includes instructions for converting the set of selected hierarchical resources to a localized schema.

In a related embodiment, the computer program product also includes instructions for determining the score for the resource member based on the proximity of the resource member to the healthcare privacy dictionary, wherein the proximity is determined using the localized schema.

In an embodiment, a computer system for managing data in a distributed computing environment includes one or more processors and one or more programming instructions stored on one or more tangible storage media of the computer system, the programming instructions being executable by the one or more processors to perform a method. The programming instructions include instructions for controlling access to a resource member based on a score determined based on a proximity of a localized schema representation of the resource member to a healthcare privacy dictionary.

In a related embodiment, the computer the resource member is a component of a set of hierarchical resources in the distributed computing environment, and comprises a data model (for example, in JSON format), or a schema-less data model in a common data format, and comprises an extension added to the data model by an upstream application.

In a related embodiment, the programming instructions further comprise instructions for selecting a set of hierarchical resources deployed in the distributed computing environment, wherein the set of hierarchical resources comprises the resource member, converting the set of selected hierarchical resources to a localized schema, determining the score for the resource member based on the proximity of the resource member to the healthcare privacy dictionary, wherein the proximity is determined using the localized schema, and for updating the set of hierarchical resources based on the determined score.

In an embodiment, a method for managing data in a distributed computing environment selects a set of hierarchical resources deployed in the distributed computing environment, wherein the set of hierarchical resources comprises a resource member. The method converts the set of selected hierarchical resources to a localized schema. The method determines a score for the resource member based on the proximity of the resource member to the healthcare privacy dictionary, wherein the proximity is determined using the localized schema. The method updates the set of hierarchical resources based on the determined score. The method controls access to a resource member based on the score determined based on a proximity of a localized schema representation of the resource member to a healthcare privacy dictionary.

In a related embodiment, the resource member is a component of a set of hierarchical resources in the distributed computing environment, and comprises a data model having a schema format (for example, JSON), or a schema-less data model in a common data format. The data model comprising an extension added to the data model by a upstream application. In further embodiments, the application, or applications, may be downstream.

BRIEF DESCRIPTION OF THE DRAWINGS

The novel features believed to be characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 3:
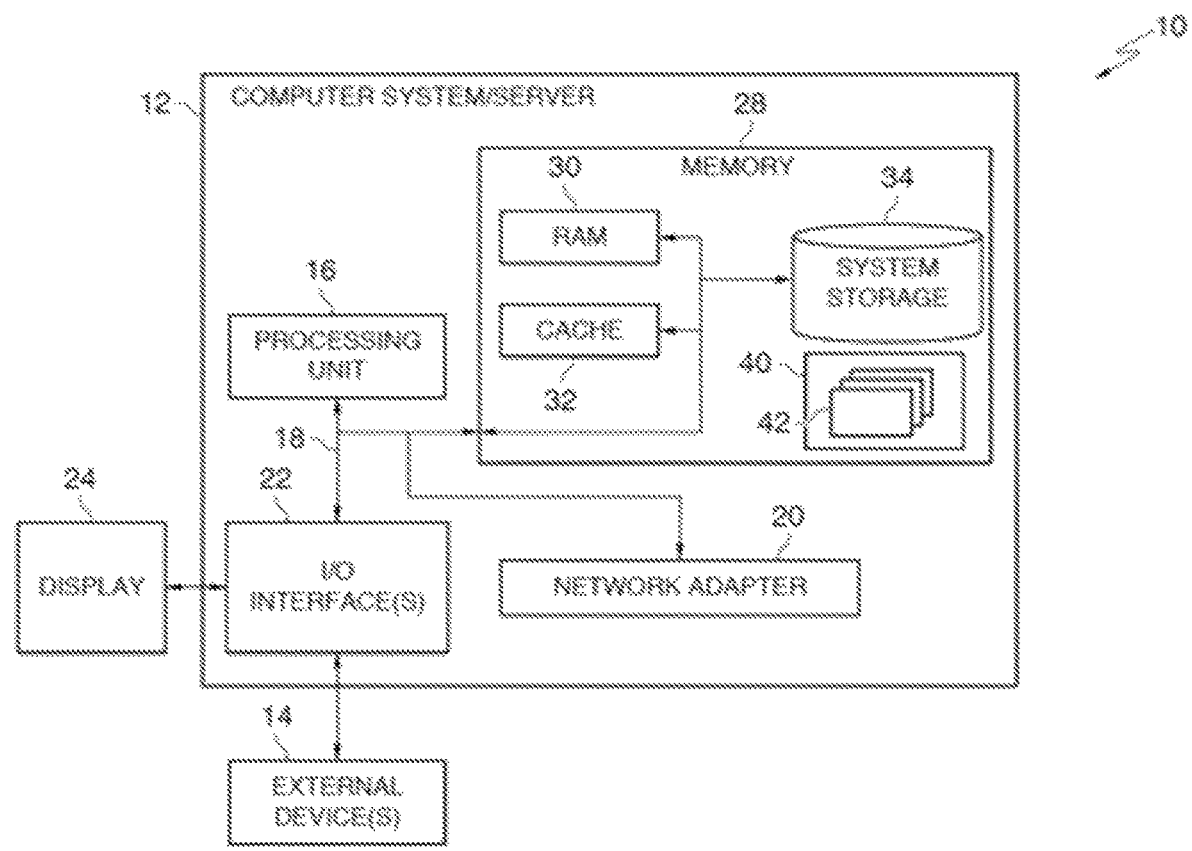
FIG. 3 is a functional block diagram of a computing device or cloud computing node, according to an embodiment of the invention.
Figure 4:
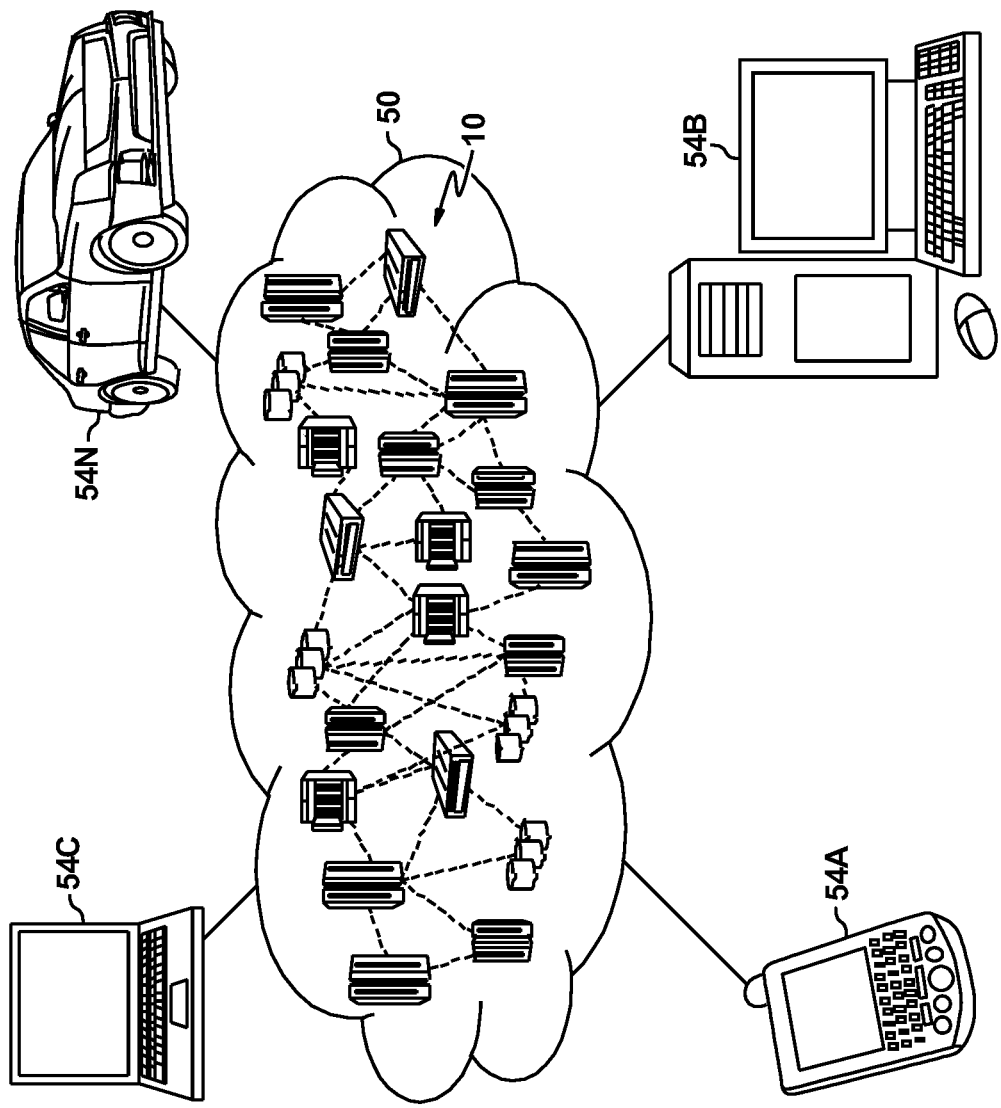
FIG. 4 is a functional block diagram of a collection of computing devices or cloud computing nodes, such as the one depicted in FIG. 3, according to an embodiment of the invention.
Figure 5:
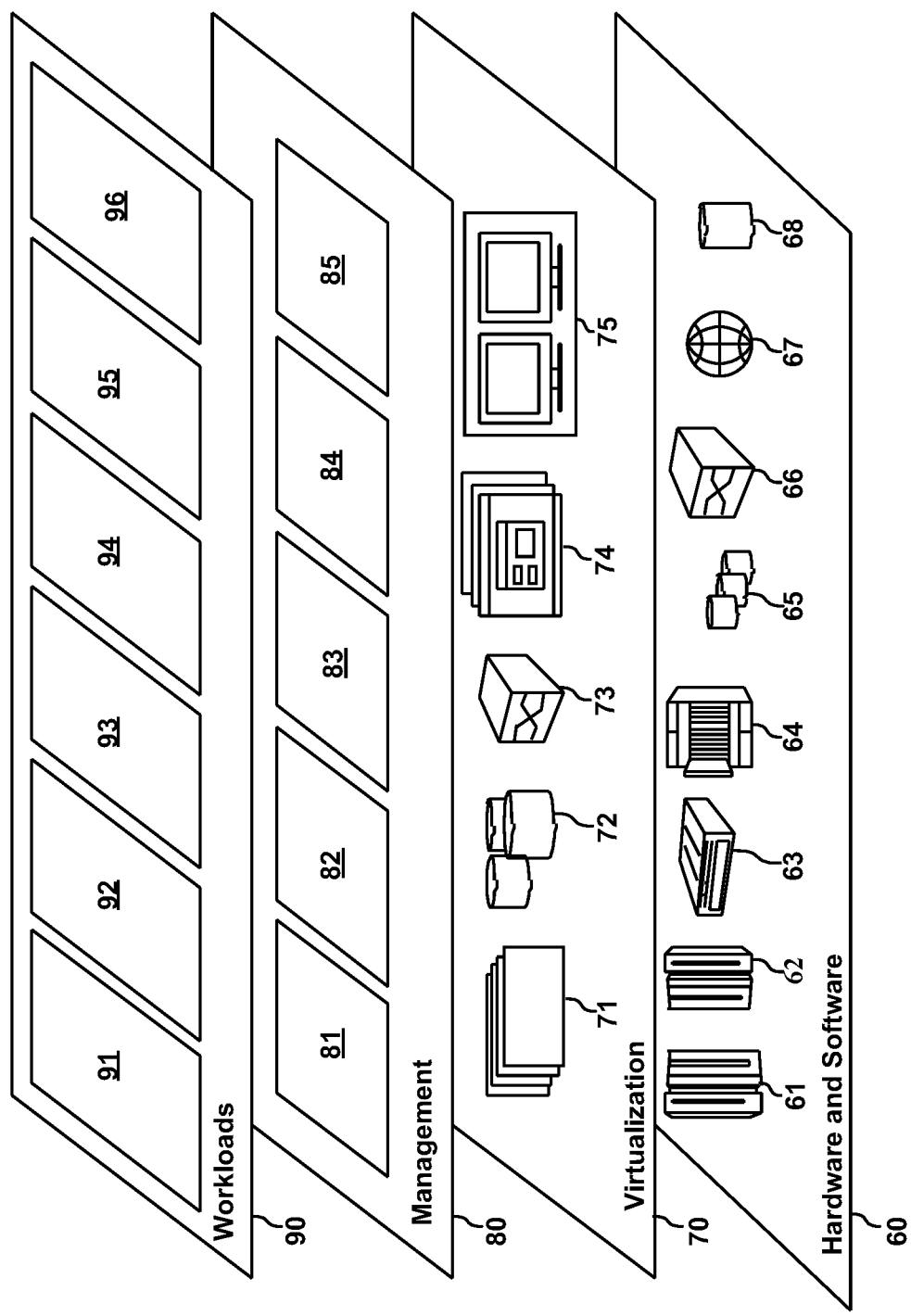
FIG. 5 is a functional block diagram of functional layers of the cloud computing environment of FIG. 4, according to an embodiment of the invention.

As described above in connection with the Background of embodiments of the invention, a healthcare system may be configured as a cloud computing platform for healthcare. An exemplary embodiment of the configuration and functional operation of such a cloud computing platform is depicted in FIGS. 3, 4, and 5.

According to an embodiment of the invention, the cloud computing platform for healthcare is a multi-tenant healthcare platform that stores and processes Electronic Health Records (EHRs), Protected Healthcare Information (PHI), and Medical Event data (collectively, "healthcare data"). The cloud computing platform for healthcare may be accessible by, and the healthcare data may belong to, multiple users, including healthcare provides, facilities, vendors, customers, patients, and other organizations and individuals. In one embodiment, data is added to the cloud computing platform for healthcare using an Extraction-Transformation-Load (ETL) pipeline. Using this pipeline, data is loaded into a data lake, data reservoir, and data mart. As a new data element arrives for loading, a pipeline executes stages that collectively perform an ETL operation to load the data into the cloud computing platform for healthcare. The new data element may be, for example, a "Health Level 7" (HL7) message, an "Admission Discharge, Transfer" (ADT) message, or a "Fast Healthcare Interoperability Resource" (FHIR) bundle.

Management and use of the data that flows into the cloud computing platform for healthcare is likely to be highly regulated by laws, regulations, and policies (collectively, "rules" or "data governance rules"). These rules may be promulgated by governments, oversight bodies, public or private institutions, or other entities. The rules may be jurisdictional, such that two jurisdictions may have different rules. For example, in the United States, US Federal regulations currently dominate the way in which data is to be handled and treated across its lifecycle. For example, there are rules for how the data is to be logged, audited, or moved. Other jurisdictions have similarly significant and stringent rules.

Some examples of data governance rules include: The Health Insurance Portability and Accountability Act (HIPAA) and the Health Information Technology for Economic and Clinical Health Act (HITECH) in the United States; the Privacy Act in Canada; and the General Data Protection Regulation (GDPR) in the European Union. Each of these rules establishes guidelines, directives, and requirements for cloud-based platforms that manage the lifecycle of the data stored on and processed by the cloud platform.

A significant challenge in even the best-designed and deployed cloud platform is that certain information (such as PHI) can still sneak into the platform in an unexpected manner. This information may personally identify a patient. This fact may violate various rules. For example, consider Fast Healthcare Interoperability Resources (FHIR) Draft Standard for Trial Use 2 (DSTU2); using application programming interfaces (APIs) for FHIR DSTU2, an upstream application extends the data model custom extensions to the data model or adds values with natural language indicative of a patient. Since the upstream application runs with the FHIR DSTU2 specification, the cloud platform may inadvertently handle the natural language or custom extensions using PHI or other healthcare data elements. This creates a gap or blind spot for the cloud platform, because there is a clear instance of non-compliance with applicable rules, but the non-compliance is not evident and goes unaddressed.

TABLE 1 provides an example FHIR Medication Administration resource, in JSON format, that illustrates this problem. In this example, the resource is a data model for tracking medication administration about a patient; in this case, "Fred". The data model includes a natural language extension (which may be, for example, a custom extension added by an upstream application) providing medication notes; in this case, "Fred was non-compliant". In this example, the resource refers to a user in natural language and honors the lenient DSTU2 data model. However, the text "Fred was not compliant" personally identifies the patient "Fred" to whom this resource corresponds. DSTU2 allows this resource to be generated and used, but this potentially violates applicable rules that govern management and use of PHI.

Table 1 (Example FHIR Medication Administration Resource)

```
{
  "resourceType": "MedicationAdministration",
  "id": "33be863d-fc52-4ed2-aede-7fbb80bfb5a9",
  "text": {
    "status": "generated",
    "div": "<span>given as 'oral administration of treatment</span>"
  },
  "dosage": { }
  "extension": [{
    "type": "Medication-Notes",
    "valueString": "Fred was non-compliant."
  }]
}
```

There is therefore a strong need for a technical solution that allows a regulated cloud computing platform for healthcare to operate as needed without handling data in a manner inconsistent with applicable rules. Persons of ordinary skill in the art will recognize that both the problem and its solutions, as enabled by embodiments of the invention, are technical in nature and constitute clear improvements to computing technology. Embodiments of the invention are not directed to compliance processes, and are necessarily rooted in computing technology. To the extent that some embodiments disclose and claim processes that include analysis, the embodiments constitute a practical application of such analysis. In other words, embodiments of the invention are directed to novel and non-obvious improvements to data governance and processing in cloud platform technologies (as to their infrastructure, configuration, and methods of operation); not to compliance.

Prior art solutions are inadequate for addressing the above-described challenges, and do not provide the advantages offered by embodiments of the invention. For example, a solution that identifies proper names from available lists of persons, places, and institutions, or by their proximity to keywords, and de-identifies them by replacing the identified words, is limited for at least the reason that it will fail if a word is not in an available list. In the case of the resource described in TABLE 1, for example, "Fred" may be captured if it is included in a list of names to be checked for; but a previously unknown name will not be detected.

Embodiments of the invention, on the other hand, enhance privacy protection for a cloud platform in a regulated environment, by performing one or more of the following functions: selecting a set of hierarchical resources in a cloud platform environment; converting the resources to a localized schema; determining proximity of the resource members to a healthcare privacy dictionary (a resource has members; a member refers to a name:value pair in the resource); scoring, based on the proximity, the localized hierarchical schema with a privacy metric; updating the score for the overall hierarchical schema; and controlling access to highly scoring resources in the set based on the aggregated schema.

In an embodiment, the controlling process includes: dynamically enforcing consent based on scoring information; forcing logging of attempted access and transfer of data; limiting logging of data or masking output data in application-specific logs; enforcing Access Control; and triggering de-identification processes for model-based elements.

In an embodiment, upon serving data back to a client, schema elements meeting a minimum score are reconstructed via an anonymizer, a redaction routine, or a de-identification routine, to reconstruct a corresponding JSON/XML resource.

In an embodiment, the described processes run in batch, near-real-time, or real-time.

In an embodiment, dictionaries may evolve based on centrality to a starting dictionary. For instance, an initial dictionary with an entry "Fred" is used to score a phrase "Fred is non-compliant". The occurrence of "non-compliant" and "is" coincident with "Fred" are recorded. Where a number of occurrences of the words with a 'central' exceeds a threshold, the words are added to the dictionary. There may be common words which are excluded, such as the word 'is'.

In an embodiment, a patient identification annotator is used, such as an Enterprise Master Patient Index or natural language annotator for medical information.

In an embodiment, a hierarchical model, such as a JSON object with nested objects, is decomposed into individual models, where a parent-child structure is decomposed into a {ROOT-parent-child, ROOT-child} structure.

Embodiments of the invention may provide one or more of the following additional advantages: improved support for data storage, data use, and data processing in regulated cloud platform environments; improved security of FHIR and Services that support natural language, natural use and grow based-on frequency and proximity with the data.

The embodiments may be implemented via a Spark application on an HBase or HDFS cluster, and may be massively parallelized. Embodiments of the invention may allow batch processing, in near real-time or in real-time. In one embodiment, the invention may be implemented in Apache SOLR as a plugin. SOLR is an open-source enterprise-search platform, written in Java, from the Apache Lucene project. Its major features include full-text search, hit highlighting, faceted search, real-time indexing, dynamic clustering, database integration, NoSQL features and rich document handling. In one embodiment, the invention may be integrated into continual scan services, such as Anti-Virus or Threat Detection, where dictionary matches and centrality are sufficiently indicative of privacy violations.

Additional embodiments of the invention will now be described in more detail in connection with FIGS. 1-5.

Figure 1:
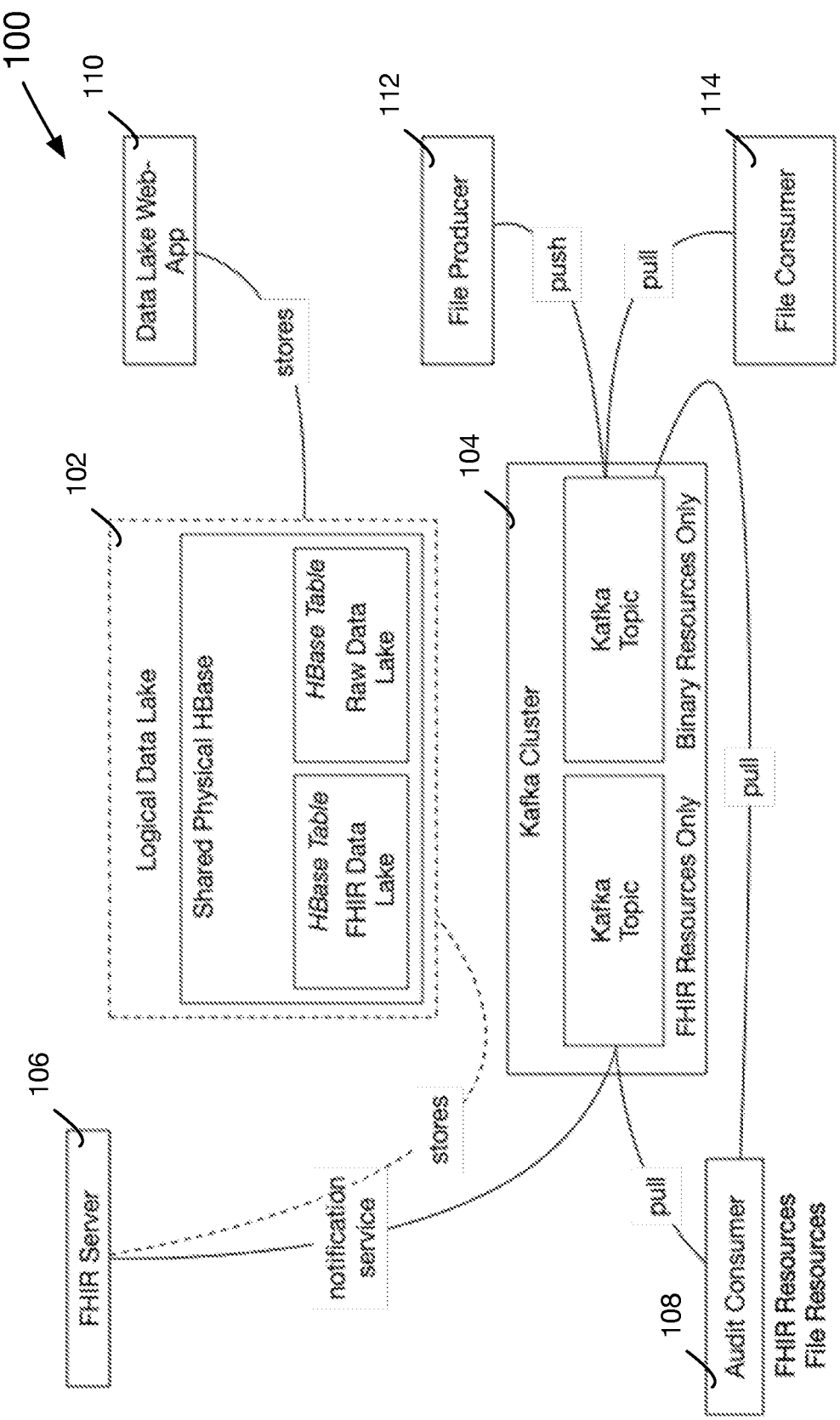
FIG. 1 is a functional block diagram of a distributed computing environment, according to an embodiment of the invention.

FIG. 1 is a functional block diagram of a distributed computing environment 100, according to an embodiment of the invention. Distributed computing environment 100 may be a cloud computing platform for healthcare. Distributed computing environment 100 may implement a messaging system to enable data exchange between processes, applications, and servers. In one embodiment, the messaging system is Apache Kafka. Some concepts that are relevant to a description of such a messaging system are provided below.

Referring now to FIG. 1, a "data lake", in its most general sense, refers to a data repository. In the context of distributed computing environment 100, it refers to a single point of storage for at least some collections of data that is processed and managed by distributed computing environment 100. For example, in one implementation, all patient raw data (such as EHRs) may be stored in a data lake. Data stored in a data lake may be in its natural or raw format. A data lake can include structured data from relational databases (rows and columns), semi-structured data (CSV, logs, XML, JSON), unstructured data (emails, documents, PDFs) and binary data (images, audio, video). Other groupings of data are also possible (such as a data reservoir, and data mart). Such groupings of data can be configured in various embodiments of the invention to facilitate the objectives of the particular implementation of distributed computing environment 100, and may be based on the nature and size of the data to be managed and processed, or by the number or type of users and other actors interacting with distributed computing environment 100.

In the embodiment depicted in FIG. 1, a Logical Data Lake 102 stores healthcare data for management and processing. Logical Data Lake 102 may have one or more databases, such as one or more shared physical HBase tables; HBase is an open-source non-relational distributed database. The Shared physical HBase may include an HBase Table constituting an "FHIR Data Lake" (storing FHIR data) and an HBase Table constituting a "Raw Data Lake" (storing raw data).

A "cluster" is a set of servers called "brokers" that implement the messaging system. Each broker may store "messages" for a "topic". Generally, a message contains data (e.g., a byte array) and a topic is an organization of that data according to a categorization; i.e., the messages are categorized, stored, and published according to some topic. Topics may be partitioned; for example, each broker may store a particular topic.

In the embodiment depicted in FIG. 1, a Kafka Cluster 104 includes one or more brokers (servers) running Apache Kafka; the servers are referred to as Kafka "brokers". The Kafka brokers store and implement Kafka topics such as an "FHIR Resources Only" topic and a "Binary Resources Only" topic, the binary resources may be represented as files.

A Data Lake Web App 110 may be an application that generates or operates on some data that is stored in Logical Data Lake 102 via a store operation.

A File Producer 112 process may be a producer pushing messages to Binary Resources Only topic of Kafka Cluster 104, and a File Consumer 114 process may be a consumer pulling messages from the Binary Resources Only topic in Kafka Cluster 104.

An "Fast Healthcare Interoperability Resource" (FHIR) Server 106 may include an application that stores data in the FHIR Data Lake of Logical Data Lake 102 via a store operation; and may include a process that pushes messages to the FHIR Resources Only topic of Kafka Cluster 104 via a notification service.

An Audit Consumer 108 process may be a consumer pulling FHIR Resource messages from the FHIR Resources Only topic of Kafka Cluster 104, and pulling File Resources messages from the Binary Resources Only topic of Kafka Cluster 104.

Some embodiments of the invention will now be described in reference to FIG. 1 and an illustrative scenario. In the illustrative scenario, distributed computing environment 100 (also referred to as a data platform or cloud computing platform for healthcare) is configured and operated to ingest a lenient hierarchical data standard, such as FHIR DSTU2, using an XML or JSON data representation. The cloud platform for healthcare offers a set of FHIR APIs via a web application ("web app"), such as web app 110.

Referring now to FIG. 1 and the illustrative scenario, the cloud platform for healthcare stores the ingested data into a data processing platform, such as HBase with a transparent Hadoop Distributed File System (HDFS) storage layer to quickly process data in a cluster.

One or more applications push two resources into distributed computing environment 100, as RESOURCE1 {2019 Dec. 5} and RESOURCE2 {2019 Dec. 6}. The contents of RESOURCE1 are provided below in TABLE 2, and the contents of RESOURCE2 are provided below in TABLE 3.

TABLE 2

(RESOURCE1)

```
{
  "resourceType": "Medication Administration",
  "id": "33be863d-fc52-4ed2-aede-7fbb80bfb5a9",
  "text": {
    "status": "generated",
    "div": "<span>given as 'oral administration of treatment' given by practitioner</span>"
  },
  "dosage": { }
  "extension": [{
    "type": "Medication-Notes",
    "valueString": "Fred was non-compliant."
  }]
}
```

TABLE 3

(RESOURCE2)

```
{
  "resourceType": "Patient",
  "telecom": [
    {
      "system": "phone",
      "value": "'555-555-5555'",
      "use": "home"
    }
  ],
```

TABLE 3-continued (RESOURCE2)

```
  "address": [
    {
      "use": "home",
      "line": ["5555 S St"],
      "city": "Durham",
      "state": "NC",
      "postalCode": "27519",
      "country": "United States"
    }
  ]
```

With continued reference to FIG. 1 and the illustrative scenario, at some point in time, distributed computing environment 100 pull recent data into a data set, using some starting date and some ending date; for example:

{START-DATE 2019 Dec. 5, END-DATE 2019 Dec. 6}

SET: RESOURCE1, RESOURCE2

Based on pulling this data, distributed computing environment 100 loads each resource to generate a schema for that resource, as provided in TABLE 4 and TABLE 5, respectively.

TABLE 4

(RESOURCE1 Localized Schema)

```
Resource{
    resourceType : String
    id : String
    dosage : Object
    text : TextObject
    extension : Array<ExtensionObject>
}
```

TABLE 4-continued (RESOURCE1 Localized Schema)

```
TextObject {
    status : String
    div : String
}
ExtensionObject {
    type : String
    valueString : String
}
```

TABLE 5

(RESOURCE2 Localized Schema)

```
Resource {
    resourceType : String
    telecom : Array<TelecomObject>
    address : Array<AddressObject>
}
TelecomObject {
    system: String
    value: String
    use: String
}
AddressObject {
    use: String
    line: Array<LineArray>
    city: String
    state: String
    postalCode: String
    country: String
}
```

Distributed computing environment 100 loads a privacy rules dictionary that defines one or more rules governing data privacy (for example, the dictionary may be designed to comply with data governance rules). For example, the privacy rules dictionary may be as provided in TABLE 6.

TABLE 6

(Privacy Rules Dictionary)

Doctor: [dr|DoctorId.|practitioner]
Phone Regular Expression: ^[2-9]\d{2}-\d{3}-\d{4}$
Home: node.parent.contains('home')
Set of Names: {Fred}

Distributed computing environment 100 loads default proximity of privacy indicators, for example as provided in TABLE 7.

TABLE 7

(Proximity Value Indicators)

Sibling Proximity: As-Received ~>3 (Tilde with right angle means within a specific distance to the right)
Lineage (Parent, Grandparent) Proximity: 2
Level 1-Lineage Siblings: Yes
Level 2-Lineage Siblings: No Distributed computing environment 100 traverses the localized schema and selects the correlated elements and scores the data based on the dictionary; for example, as provided in TABLE 8.

TABLE 8

(Selection & Scoring Output)

```
Resource 1:
    text.div contains DOCTOR
    extension[0].valueString contains PROPER NAME
Resource 2:
    telecom[0].value contains PHONE
```

Distributed computing environment 100 takes the initial findings (for example, the output noted in TABLE 8) and maps out costs for each schema, and federates (i.e., applies more generally) the costs in the aggregate schema for the resource under consideration (the aggregate schema may be for the current set of resources, the current resource, or all resources or the average of all resources); for example, as provided in TABLE 9.

TABLE 9

(Mapping Costs In Overall Schema)

```
TextObject {
    status : { score : 1}
    div : { score : 1}
}
TelecomObject {
    system: { score : 1}
    value: { score : 1}
    use: { score : 1}
}
ExtensionObject {
    type : { score : 1}
    valueString : { score : 1}
}
```

Distributed computing environment 100 uses the scores in TABLE 9 to control resource and data access based on the aggregated schema, and may force logging of attempted access and attempted data transfers.

With continued reference to FIG. 1, embodiments of the invention may be integrated into distributed computing environment 100 (for example, as a cloud computing platform for healthcare), and performs one or more of the following functions (for example, in the sequences described in connection with FIG. 2): selecting a set of hierarchical resources; converting the resources to a localized schema; determining proximity of the resource members to a healthcare privacy dictionary; scoring, based on the proximity, the localized hierarchical schema with a privacy metric; updating the score for the overall hierarchical schema; and controlling access to highly scoring resources in the set based on the aggregate schema.

With continued reference to FIG. 1, and according to one implementation, selecting a set of hierarchical resources in an environment includes the following: distributed computing environment 100 scans ingested data based on the ingested start and end times and dates. Distributed computing environment 100 serializes a set of binary resources to JSON or XML. Distributed computing environment 100 operates on serialized data and caches the data in a secondary column for each resource. Distributed computing environment 100 may only calculate the difference between one version and a second version of a resource, thus speeding up the calculation of a new score. Distributed computing environment 100 may cache a previously determined localized schema.

With continued reference to FIG. 1, and according to one implementation, converting, for each resource, to a localized schema includes the following: distributed computing environment 100 converts the resource to a localized schema via a schema generation process. For example, for a resource identified in a JSON format, distributed computing environment 100 converts the XML into an XML schema definition (XSD); and for a resource identified in XML format, distributed computing environment 100 converts the XML using XSD-GEN. Alternatively, for JSON, distributed computing environment 100 traverses the tree to generate a flattened hierarchy based on name:value, name:object, name:array, array. Distributed computing environment 100 may decompose a hierarchical model into individual hierarchical models, such that a parent-child node set becomes {ROOT-parent-child, ROOT-child, ROOT-array-child}.

With continued reference to FIG. 1, and according to one implementation, determining the proximity of the resource members to a healthcare privacy dictionary includes the following: distributed computing environment 100 builds a privacy rules dictionary, or alternatively uses an existing one. The proximity may be determined based on the parsed proximity or the textual proximity as the resource is viewed in raw text.

Building the privacy rules dictionary may be performed using different types of rules. For example, a first rule may match with words within a proximity (for example, Doctor: [dr|Doctor|d.|practitioner]→3 (the tilde symbol with a right angle means "within a specific distance to the right"). These rules may be developed using an expert assistance of a mined set of resources, which provide a summarized candidate schema and value grammar. A second rule may use regular expressions to match formats of words (for example, Phone Regular Expression: ^[2-9]\d{2}-\d{3}-\d{4}$). A third rule may use path information (using, for example, JSONPath or XPath; the rule may be: $ . . . book[?(@.price<=$['expensive'])]; for example, "Home: node-.parent.contains('home')"). A fourth rule may provide dictionaries (for example, data is represented in a lookup hash set; for example: "Set of Names: {Fred}"). Other rules may also be used.

Distributed computing environment 100 may use lemmatization and stemming to identify root words; distributed computing environment 100 may also check a set of service-specific keywords based on proximity searches; for example: "PTN Identifier"~10. In an embodiment, distributed computing environment 100 may re-assemble a dictionary based on the proximity search results (for example, up to a limited number of entries). The dictionary may evolve based on the centrality to the starting dictionary.

With continued reference to FIG. 1, and according to one implementation, scoring and updating the hierarchical and instance score includes the following: distributed computing environment 100 scores the hierarchy and schema based on the relation to the schema. For example, distributed computing environment 100 may tune the proximity search based on sampling of resources ingested. For example, two sentences may be ingested in resources: "MD to see Fred" in a resource identifies a value 'Fred' in a sentence; another sentence may be "MD to see the patient—Fred". The first example is three away, the second example is five away; the search can be tuned to the average of four away. The localized hierarchical schema with a privacy metric. Distributed computing environment 100 updates the score for the overall hierarchical schema. The overall hierarchical schema may be partitioned based on a specific set of keys that are hashed together; for example, Hash(ResourceType: Patient).

With continued reference to FIG. 1, and according to one implementation, controlling the access to highly scoring resources includes the following: distributed computing environment 100 dynamically enforces consent based on score; forces logging of attempted access and transfer to data; limits logging of data or masks output data in application specific logs; enforces Access Control; triggers a de-identification process for model-based elements; and posts a risk model for the data in the corresponding service. For example, in dynamic consent enforcement, the retrieval of the related data is gated using access control for a need-to-know. In a further example, the logging writes to an audit log related to the ingestion of private identifiable and private data. For yet another example, the data is masked, such that a value "Fred was non-compliant." is masked to "<PATIENT_IDENTIFIER_1>", the data is stored in a lookup table to map the replacement with a match between the mask and the previous data value. In alternative embodiments, a set of resources matching the schema are de-identified ensuring the data is statistically similar. Alternatively, the risk model is generated scoring the risk related to each value, such that a risk model related to ingested data is made available downstream.

Figure 2:
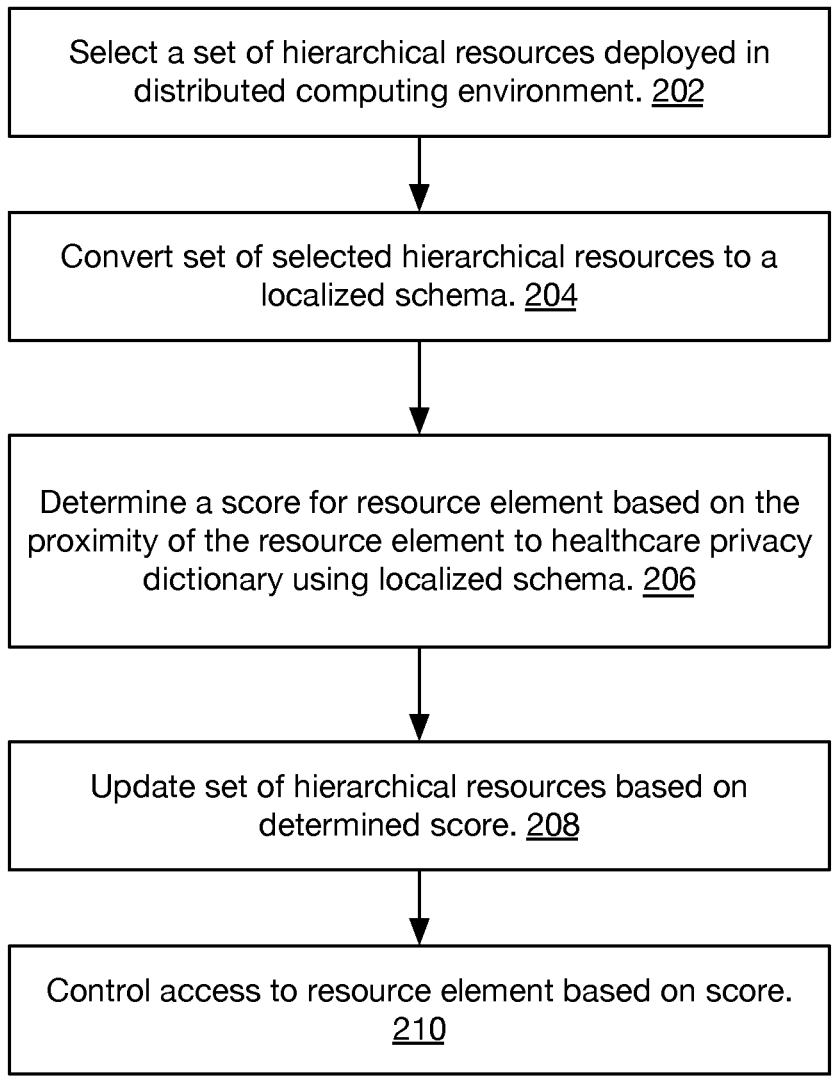
FIG. 2 is a flowchart of a method for managing a distributed computing environment, according to an embodiment of the invention.

FIG. 2 is a flowchart of a method 200 for managing a distributed computing environment, according to an embodiment of the invention. Method 200 may be implemented as programming instructions of a computer program, stored on a tangible storage medium of a computer having a processor; such that executing the programming instructions by the processor performs the enumerated steps of method 200. In an embodiment, the computer may be a computer system or node in distributed computing environment 100 (such as the computing system or node described in connection with FIG. 3).

Referring now to FIG. 2, method 200 for managing data in a distributed computing environment selects (step 202) a set of hierarchical resources deployed in the distributed computing environment, wherein the set of hierarchical resources comprises a resource member.

The method converts (step 204) the set of selected hierarchical resources to a localized schema.

The method determines (step 206) a score for the resource member based on the proximity of the resource member to the healthcare privacy dictionary, wherein the proximity is determined using the localized schema.

The method updates (step 208) the set of hierarchical resources based on the determined score.

The method controls (step 210) access to a resource member based on the score determined based on a proximity of a localized schema representation of the resource member to a healthcare privacy dictionary.

In related embodiments, method 200 performs one or more fewer steps, or one or more additional steps. In yet other embodiments, steps of method 200 are performed in a different order; some steps may be performed by another computing device or node, or by another environment altogether.

FIG. 3 is a block diagram of an illustrative cloud computing node, according to an embodiment of the invention. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove (for example, in connection with FIGS. 1-10, above, and particularly first storage device 706, IoT devices, and other components described in connection with FIG. 7).

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

FIG. 4 is a block diagram of a cloud computing environment including the cloud computing node of FIG. 3, according to an embodiment of the invention. Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that cloud computing nodes 10 and cloud computing environment 50 can communicate with any type of computerized device over any type of network and/or network addressable connection (e.g., using a web browser).

FIG. 5 is a block diagram of functional layers of the cloud computing environment of FIG. 4, according to an embodiment of the invention. Referring now to FIG. 5, a set of functional abstraction layers provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; managing data 96, including those described in connection with FIGS. 1-4, above.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for managing data in a distributed computing environment, comprising:
    determining a score for a resource member based on proximity of a localized schema representation of the resource member to a healthcare privacy dictionary, the score representing a privacy metric;
    controlling access to the resource member based on the score; and
    wherein the resource member comprises a data model having at least one of a schema format or a schema-less common data format, the data model further including an extension added to the data model by an upstream application.

2. The method of claim 1, wherein the data model is in JSON format, RDF format or XML format.

3. The method of claim 1, wherein the resource member is a component of a set of hierarchical resources in the distributed computing environment.

4. The method of claim 1, further comprising:
    selecting a set of hierarchical resources deployed in the distributed computing environment, wherein the set of hierarchical resources comprises the resource member.

5. The method of claim 4, further comprising:
    converting the set of selected hierarchical resources to a localized schema.

6. The method of claim 5, further comprising:
    determining the score for the resource member based on the proximity of the resource member to the healthcare privacy dictionary, wherein the proximity is determined using the localized schema.

7. The method of claim 6, further comprising:
    updating the set of hierarchical resources based on the determined score.

8. A computer program product for managing data in a distributed computing environment, comprising one or more computer readable storage media, and program instructions collectively stored on the one or more computer readable storage media, the program instructions comprising instructions for:
    controlling access to a resource member based on a score, the score representing a privacy metric;
    wherein the score is determined, and the access is controlled, based on a proximity of a localized schema representation of the resource member to a healthcare privacy dictionary; and
    wherein the resource member comprises a data model having at least one of a schema format or a schema-less common data format, the data model further including an extension added to the data model by an upstream application.

9. The computer program product of claim 8, wherein the data model is in JSON format, RDF format or XML format.

10. The computer program product of claim 8, wherein the resource member is a component of a set of hierarchical resources in the distributed computing environment.

11. The computer program product of claim 8, further comprising:
    selecting a set of hierarchical resources deployed in the distributed computing environment, wherein the set of hierarchical resources comprises the resource member.

12. The computer program product of claim 11, further comprising:
    converting the set of selected hierarchical resources to a localized schema.

13. The computer program product of claim 12, further comprising:
    determining the score for the resource member based on the proximity of the resource member to the healthcare privacy dictionary, wherein the proximity is determined using the localized schema.

14. A computer system for managing data in a distributed computing environment, comprising:
    one or more processors and one or more programming instructions stored on one or more tangible storage media of the computer system, the programming instructions being executable by the one or more processors to perform a method, the programming instructions comprising instructions for:
    controlling access to a resource member based on a score, the score representing a privacy metric;
    wherein the score is determined, and the access is controlled, based on a proximity of a localized schema representation of the resource member to a healthcare privacy dictionary;
    wherein the resource member comprises a data model having at least one of a schema format or a schema-less common data format, the data model further including an extension added to the data model by an upstream application.

15. The computer system of claim 14, wherein the programming instructions further comprise instructions for:
    selecting a set of hierarchical resources deployed in the distributed computing environment, wherein the set of hierarchical resources comprises the resource member.

16. The computer system of claim 15, wherein the programming instructions further comprise instructions for:
    converting the set of selected hierarchical resources to a localized schema;
    determining the score for the resource member based on the proximity of the resource member to the healthcare privacy dictionary, wherein the proximity is determined using the localized schema; and
    updating the set of hierarchical resources based on the determined score.

* * * * *